United States Patent
Miyaura

(10) Patent No.: US 10,571,145 B2
(45) Date of Patent: Feb. 25, 2020

(54) MAINTENANCE SUPPORT SYSTEM FOR AIR CONDITIONERS

(71) Applicant: Mitsubishi Electric Corporation, Tokyo (JP)

(72) Inventor: Yohei Miyaura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/557,261

(22) PCT Filed: Apr. 7, 2015

(86) PCT No.: PCT/JP2015/060862
§ 371 (c)(1),
(2) Date: Sep. 11, 2017

(87) PCT Pub. No.: WO2016/162952
PCT Pub. Date: Oct. 13, 2016

(65) Prior Publication Data
US 2018/0058712 A1  Mar. 1, 2018

(51) Int. Cl.
*F24F 11/30* (2018.01)
*F24F 11/62* (2018.01)
(Continued)

(52) U.S. Cl.
CPC ............. *F24F 11/30* (2018.01); *F24F 11/62* (2018.01); *F24F 11/89* (2018.01); *F24F 11/52* (2018.01);
(Continued)

(58) Field of Classification Search
CPC .. F24F 11/30; F24F 11/89; F24F 11/62; F24F 11/52; F24F 11/56; F24F 11/54; G05B 2219/32014
(Continued)

(56) References Cited

U.S. PATENT DOCUMENTS 5,697,224 A  12/1997 Sumida
7,092,794 B1  8/2006 Hill et al.
(Continued)

FOREIGN PATENT DOCUMENTS

EP  1 196 002 A2  4/2002
JP  3102208 B2  8/2000
(Continued)

OTHER PUBLICATIONS

International Search Report of the International Searching Authority dated Jul. 7, 2015 for the corresponding international application No. PCT/JP2015/060862 (and English translation).
(Continued)

*Primary Examiner* — Kenneth M Lo
*Assistant Examiner* — Mohammed Shafayet
(74) *Attorney, Agent, or Firm* — Posz Law Group, PLC

(57) ABSTRACT

A maintenance support system includes an air conditioner system including air conditioners, an Internet line, a portable terminal and a server, and supports maintenance of the system. The system, portable terminal, and server are communicably interconnected via the Internet line. The server stores individual identification information, operation information and abnormality history of each air conditioner. The portable terminal receives the individual identification information, operation information and abnormality history of each air conditioner from the server. The portable terminal includes an image pickup unit photographing a space to acquire a picked-up image thereof, and a display unit displaying the air conditioner included in the picked-up image and one of the individual identification information, the operation information and the abnormality information of the air conditioner in association with each other with one being superimposed on other.

10 Claims, 7 Drawing Sheets

(51) Int. Cl.
    *F24F 11/89*         (2018.01)
    *F24F 11/54*         (2018.01)
    *F24F 11/56*         (2018.01)
    *F24F 11/52*         (2018.01)

(52) U.S. Cl.
    CPC ............... *F24F 11/54* (2018.01); *F24F 11/56* (2018.01); *G05B 2219/32014* (2013.01)

(58) Field of Classification Search
    USPC ....................................................... 700/276
    See application file for complete search history.

(56) References Cited

U.S. PATENT DOCUMENTS

| | | | |
|---|---|---|---|
| 9,558,592 B2* | 1/2017 | Mullins | G06T 19/006 |
| 2002/0154057 A1 | 10/2002 | Ueda et al. | |
| 2004/0183722 A1 | 9/2004 | Ueda et al. | |
| 2006/0001757 A1* | 1/2006 | Sawachi | G01C 21/20 348/333.12 |
| 2010/0268451 A1* | 10/2010 | Choi | G01C 21/3602 701/533 |
| 2010/0295700 A1* | 11/2010 | Mauk | H01R 13/6456 340/9.1 |
| 2011/0057044 A1* | 3/2011 | Nishino | F24F 11/30 236/49.3 |
| 2011/0115816 A1* | 5/2011 | Brackney | G06Q 10/06 345/629 |
| 2011/0189938 A1* | 8/2011 | Yoshii | F24F 11/0001 454/256 |
| 2011/0193985 A1* | 8/2011 | Inoue | H04N 5/23216 348/222.1 |
| 2011/0242134 A1* | 10/2011 | Miller | G06T 19/006 345/633 |
| 2011/0312278 A1* | 12/2011 | Matsushita | H04L 12/40013 455/66.1 |
| 2012/0091204 A1* | 4/2012 | Shi | G06K 7/146 235/437 |
| 2012/0092507 A1* | 4/2012 | Jung | H04N 5/23293 348/207.1 |
| 2012/0092528 A1* | 4/2012 | Jung | G06T 11/60 348/239 |
| 2012/0158189 A1* | 6/2012 | Cho | H04L 12/2829 700/276 |
| 2012/0169584 A1* | 7/2012 | Hwang | H04L 12/2818 345/156 |
| 2013/0195367 A1* | 8/2013 | Ohira | G06K 9/228 382/206 |
| 2013/0222672 A1* | 8/2013 | Kim | H04N 5/23293 348/333.11 |
| 2013/0288719 A1 | 10/2013 | Alonzo | |
| 2014/0300634 A1* | 10/2014 | Cho | G06T 19/00 345/633 |
| 2014/0300775 A1* | 10/2014 | Fan | H04N 5/23229 348/231.3 |
| 2015/0061841 A1* | 3/2015 | Lee | G08C 17/02 340/12.5 |
| 2015/0062161 A1* | 3/2015 | Kim | G06T 19/006 345/633 |
| 2015/0185742 A1* | 7/2015 | Morita | G05D 23/1902 700/276 |
| 2015/0193982 A1* | 7/2015 | Mihelich | H04W 4/026 345/633 |
| 2015/0330646 A1 | 11/2015 | Matsumoto | |
| 2016/0162748 A1* | 6/2016 | Bastide | G06T 11/00 345/633 |

FOREIGN PATENT DOCUMENTS

| | | |
|---|---|---|
| JP | 2002-317995 A | 10/2002 |
| JP | 2004-028387 A | 1/2004 |
| JP | 2011-185531 A | 9/2011 |
| JP | 2012-172910 A | 9/2012 |
| JP | 2014-173815 A | 9/2014 |
| JP | 2014-190686 A | 10/2014 |

OTHER PUBLICATIONS

Extended EP Search Report dated Nov. 2, 2017 issued in corresponding EP patent application No. 15866398.9.

\* cited by examiner

MAINTENANCE SUPPORT SYSTEM FOR AIR CONDITIONERS

CROSS REFERENCE TO RELATED APPLICATION

This application is a U.S. national stage application of International Patent Application No. PCT/JP2015/060862 filed on Apr. 7, 2015, the disclosure of which is incorporated herein by reference.

TECHNICAL FIELD

The present invention relates to a maintenance support system that supports maintenance of an air conditioner system including a plurality of air conditioners.

BACKGROUND

An air conditioner system includes a plurality of air conditioners and an operation unit for operating the plurality of air conditioners, for example, a remote controller. Some air conditioner system controls a plurality of air conditioners as a group using one remote controller. Some remote controller has a function of causing an air conditioner system to execute operation for checking whether an abnormality occurs in an air conditioner or a function of causing the air conditioner system to display an identification number of an air conditioner in which an abnormality occurs and an abnormality code indicating content of the abnormality. For example, Patent Literature 1 has description of a system that displays, on a display unit provided in a remote controller, an identification number indicating an air conditioner in which an abnormality is caused and an abnormality code indicating a type of the caused abnormality. Patent Literature 1 has mention that the system brings all air conditioners to a halt condition and causes a fan of the abnormality-caused air conditioner to be driven.

PATENT LITERATURE

Patent Literature 1: Japanese Patent No. 3102208.

In Patent Literature 1, by displaying the abnormality code and the identification number on the remote controller, it is possible to inform an operator of the air conditioner in which the abnormality has been caused and the type of the caused abnormality. However, the operator needs to grasp a correspondence relation between identification numbers and actual air conditioners for discriminating, from the identification number displayed on the display unit of the remote controller, the air conditioner in which the abnormality occurs. A method of bringing all the air conditioners to the halt condition and causing the fan of the air conditioner in which the abnormality occurs to be driven as described in Patent Literature 1 can enable the operator to easily discriminate the air conditioner in which the abnormality occurs. However, because the air conditioners in which abnormalities do not occur are brought to the halt condition, it is likely that comfort is spoiled. When the fan of the air conditioner is broken down, because the air conditioner in which the abnormality occurs is not operated, the operator cannot easily discriminate the air conditioner in which the abnormality occurs.

When the multiple air conditioners are divided into a plurality of groups and controlled in the same space, it is necessary to check whether an abnormality occurs in the air conditioners for each of the groups. Therefore, work is complicated.

SUMMARY

The present invention has been devised in view of the above circumstances, and it is an object of the present invention to provide a maintenance support system that makes it possible to easily and quickly check whether an abnormality occurs in an air conditioner.

In order to solve the above-mentioned problems and achieve the object, the present invention provides a maintenance support system that supports maintenance of an air conditioner system including a plurality of air conditioners disposed in one room and connected to a communication line, the maintenance support system comprising: a server connected to the air conditioner system via the communication line, the server storing at least one of position information, individual identification information, operation information and abnormality history of each of the air conditioners; and a portable terminal connected to the server via the communication line, the portable terminal receiving at least one of the individual identification information, the operation information and the abnormality history of each of the air conditioners from the server, wherein the portable terminal includes: an image pickup unit that acquires a picked-up image; a control unit that specifies, on the basis of the position information, the air conditioner included in the picked-up image, and creates an image obtained by superimposing, on the air conditioner included in the picked-up image, at least one of the individual identification information, the operation information and the abnormality history of the air conditioner; and a display unit that displays the image created by the control unit.

According to the present invention, there is an effect that it is possible to provide a maintenance support system that can easily and quickly check whether an abnormality occurs in an air conditioner.

DETAILED DESCRIPTION

A maintenance support system for air conditioners according to an embodiment of the present invention is described in detail below with reference to the drawings.

Note that the following description of the embodiment does not limit the present invention.

First Embodiment

Figure 1:
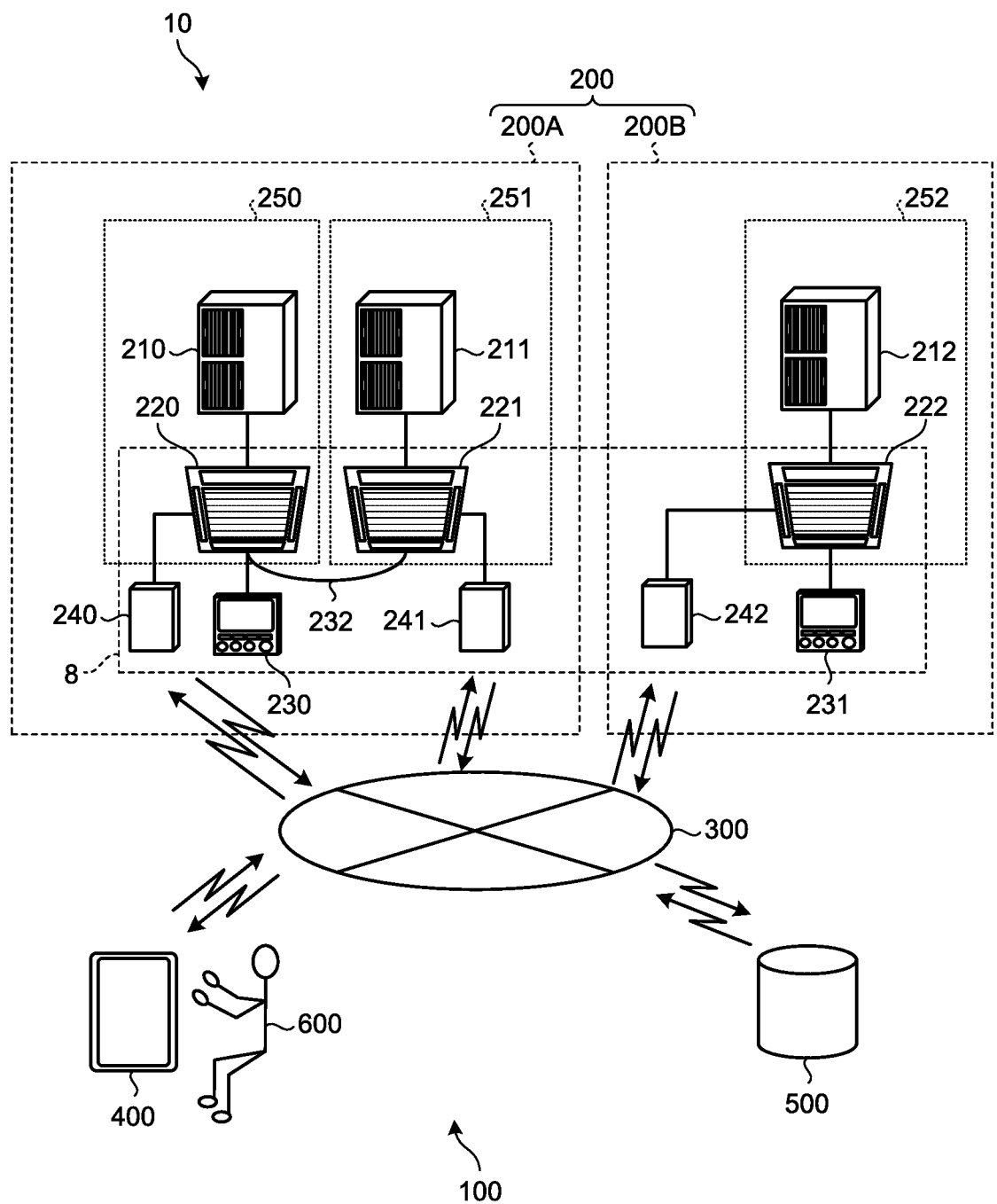
FIG. 1 is a diagram schematically showing a maintenance support system for air conditioners.

FIG. 1 is a diagram schematically showing an air conditioning system 10 including a maintenance support system (hereinafter abbreviated as support system) 100 for air conditioners according to a first embodiment. The air conditioning system 10 includes an air conditioner system 200 including a plurality of air conditioners, an Internet line 300, and the support system 100. The support system 100 includes a portable terminal 400 and a server 500, and supports maintenance of the air conditioner system 200. In the air conditioning system 10, the air conditioner system 200, the portable terminal 400 and the server 500 are connected to one another via the Internet line 300 in such a manner that they can intercommunicate. In the following explanation, communication is performed via the Internet line 300 in the air conditioning system 10 of the first embodiment. However, a communication line other than the Internet line 300 may also be used. Parts of the air conditioning system 10 may perform communication by wire, may perform communication by wireless, or may perform communication by a combination of wired system and a wireless system. The portable terminal 400 is used by an operator 600.

The air conditioner system 200 performs at least one of cooling, heating and dehumidification for the interior of one room 8, and conditions the air in the interior of the room 8. In the first embodiment, the air conditioner system 200 includes two air conditioner groups, that is, an air conditioner group 200A and an air conditioner group 200B. In the first embodiment, the air conditioner group 200A is set as a group A and the air conditioner group 200B is set as a group B. The air conditioner group 200A includes outdoor units 210 and 211, indoor units 220 and 221, communication interfaces 240 and 241 and a remote controller 230. The air conditioner group 200B includes an outdoor unit 212, an indoor unit 222, a communication interface 242 and a remote controller 231. The indoor units 220, 221 and 222, the communication interfaces 240, 241 and 242, and the remote controllers 230 and 231 are set in the room 8.

In the air conditioner group 200A, the outdoor unit 210 and the indoor unit 220 constitute one independent refrigeration circuit. A combination of the outdoor unit 210 and the indoor unit 220 is an air conditioner 250. The air conditioner 250 circulates a thermal medium between the outdoor unit 210 and the indoor unit 220 and conditions the air in the room in which the indoor unit 220 is installed. The indoor unit 220 is connected to the outdoor unit 210, the remote controller 230 and the communication interface 240, and performs information transmission to and reception from the outdoor unit 210, the remote controller 230 and the communication interface 240. The air conditioner 250 performs control on the basis of an operation signal inputted from the remote controller 230. The air conditioner 250 performs, using a processing function for at least one of the outdoor unit 210 and the indoor unit 220, a self-diagnosis concerning whether an abnormality occurs.

In the air conditioner group 200A, the outdoor unit 211 and the indoor unit 221 constitute one independent refrigeration circuit. A combination of the outdoor unit 211 and the indoor unit 221 is an air conditioner 251. The air conditioner 251 has a configuration similar to the configuration of the air conditioner 250 except that a position of placement is different. The air conditioner 251 performs communication via the communication interface 241 and performs control on the basis of a signal inputted from the remote controller 230. The indoor unit 221 is connected to the indoor unit 220 via a remote-controller communication line 232.

In the air conditioner group 200B, the outdoor unit 212 and the indoor unit 222 constitute one independent refrigeration circuit. A combination of the outdoor unit 212 and the indoor unit 222 is an air conditioner 252. The air conditioner 252 circulates a thermal medium between the outdoor unit 212 and the indoor unit 222, and conditions the air in the room in which the indoor unit 222 is installed. The indoor unit 222 is connected to the outdoor unit 212, the remote controller 231 and the communication interface 242, and performs information transmission to and reception from the outdoor unit 212, the remote controller 231 and the communication interface 242. The air conditioner 252 performs control on the basis of an operation signal inputted from the remote controller 231. The air conditioner 252 performs, using a processing function for at least one of the outdoor unit 212 and the indoor unit 222, a self-diagnosis concerning whether an abnormality occurs.

In the air conditioner system 200, one air conditioner includes one indoor unit and one outdoor unit. However, the air conditioner system 200 is not limited to this manner. A plurality of air conditioners may share one outdoor unit. That is, one outdoor unit may be connected to a plurality of indoor units. Also in the air conditioner system 200, two groups, that is, the air conditioner groups 200A and 200B are provided. However, the system may be realized by one air conditioner group, or three or more air conditioner groups. The number of air conditioners included in the air conditioner group 200A or 200B is not particularly limited, and may be one or more.

The remote controller 230 is an input device with which a user or the operator 600 inputs an operation to the air conditioner group 200A. The remote controller 231 is an input device with which the user or the operator 600 inputs an operation to the air conditioner group 200B. The remote controller 230 and the remote controller 231 are the same in a basic configuration except that control targets therefor are different. Therefore, the remote controller 230 is representatively explained. The remote controller 230 includes, for example, an input unit that receives an input from the user or the operator 600, a display unit that displays various kinds of information, a remote-controller control unit that controls operations of the parts of the remote controller 230, a remote-controller storing unit, and a communication unit that communicates with the indoor units 220 and 221. The remote controller 230 includes, as the input unit, a touch panel or physical switches including button(s) and/or dial(s). The remote controller 230 includes, as the display unit, a touch panel or a display. In the remote controller 230, the input unit and the display unit may be integrated into a touch panel. The remote controller 230 sends a signal based on the input operation to the air conditioners 250 and 251.

The communication interface 240 is connected to the indoor unit 220, and performs, via the Internet line 300, communication between the indoor unit 220 and an apparatus connected to the Internet line 300. The communication interface 241 is connected to the indoor unit 221, and performs, via the Internet line 300, communication between the indoor unit 221 and an apparatus connected to the Internet line 300. The communication interface 242 is connected to the indoor unit 222, and performs, via the Internet line 300, communication between the indoor unit 222 and an apparatus connected to the Internet line 300. The communication interfaces 240, 241 and 242 send received signals to the indoor units 220, 221 and 222, and transmit signals outputted from the indoor units 220, 221 and 222 to the apparatuses that are their communication destinations. The communication interfaces 240, 241 and 242 can use, as communication with the Internet line 300, communication performed using Wi-Fi (Wireless Fidelity) which is one kind of wireless LAN. The communication interfaces 240, 241 and 242 may be connected to a modem placed in the room 8 by wire or wireless and connected to the Internet line 300 via the modem. As a wireless communication method with the modem, there are a method based on an infrared communication standard in which an infrared ray is used, and a method based on a Bluetooth® standard in which a 2.4 GHz radio wave is used.

Figure 2:
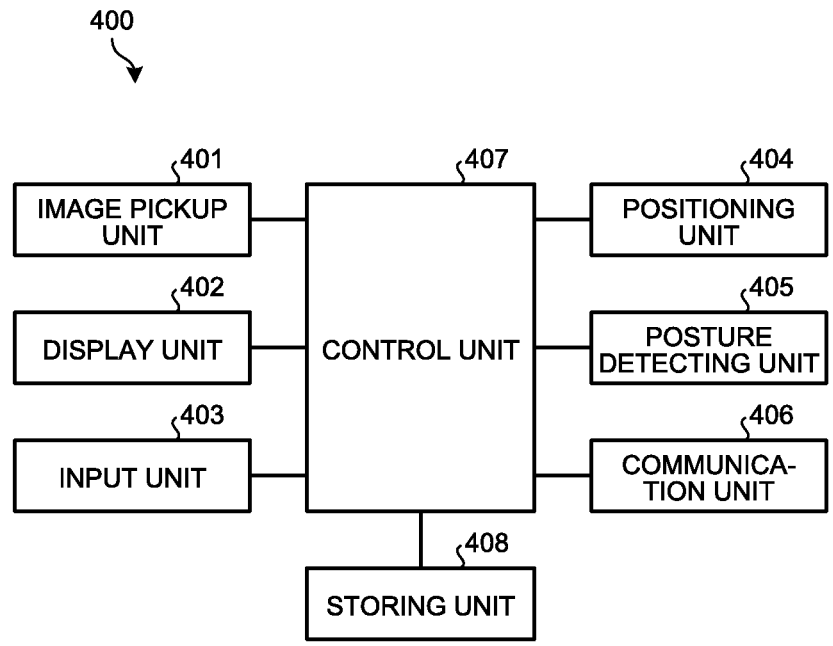
FIG. 2 is a block diagram showing the configuration of a portable terminal.

The portable terminal 400 is a terminal device with which the operator 600 performs operation. FIG. 2 is a block diagram showing the configuration of the portable terminal 400. The portable terminal 400 includes an image pickup unit 401, a display unit 402, an input unit 403, a positioning unit 404, a posture detecting unit 405, a communication unit 406, a control unit 407, and a storing unit 408. The image pickup unit 401 acquires a picked-up image of a space. Specifically, the operator performs operation to photograph the room 8 and acquire a picked-up image including images of the air conditioners 250, 251 and 252. As the image pickup unit 401, a CMOS (Complementary Metal Oxide Semiconductor) image sensor or a CCD (Charge Coupled Device) image sensor is exemplified.

The display unit 402 displays various kinds of images including the picked-up image acquired by the image pickup unit 401 and an operation screen. In the first embodiment, the display unit 402 is one of various kinds of output devices that display images. As the display unit 402, a touch panel or a display is exemplified.

The input unit 403 receives an input from the operator 600. The input unit 403 is a device with which the operator 600 inputs an operation based on a touch, a physical switch, or the like. As the input unit 403, a touch panel, a mouse, or a keyboard is exemplified. The portable terminal 400 may include a touch panel in which the display unit 402 and the input unit 403 are integrated.

The positioning unit 404 detects information concerning the position of the portable terminal 400. As the positioning unit 404, a device that performs measurement based on a global positioning system (GPS), an IMES (Indoor Messaging System), autonomous navigation calculation processing system, or a system obtained by combining these system is exemplified. When the GPS is used, the positioning unit 404 receives signals outputted from a plurality of GPS satellites and acquires information concerning the present position on the basis of the received signals. The positioning unit 404 can detect latitude, longitude and height as the information concerning the present position. The positioning unit 404 can specify at least one of a room and a floor number on the basis of the latitude, the longitude and the height, and can include at least one of a room ID and the floor number in the information concerning the present position. When the IMES is used, the positioning unit 404 receives a signal outputted from a ground complementary satellite set in the room 8 or around the room 8, and acquires information concerning the present position on the basis of the received signal. The floor number or the room ID can be included in the signal transmitted from the ground complementary satellite. Therefore, the positioning unit 404 can specify a floor number and a room ID for a present position on the basis of the signal.

The posture detecting unit 405 acquires information on a posture of the portable terminal 400, that is, a posture of a housing of the portable terminal 400. As the posture detecting unit 405, an acceleration sensor, a gyro sensor or a geomagnetic sensor, or a combination of these sensors is exemplified. The posture detecting unit 405 desirably acquires information on an orientation with respect to the geomagnetism as the posture of the portable terminal 400.

The communication unit 406 performs wireless communication with the Internet line 300. The communication unit 406 communicates with the server 500 via the Internet line 300.

The control unit 407 controls the units of the portable terminal 400. The control unit 407 is a processor such as a CPU (Central Processing Unit) and is a device that executes commands described in a computer program, that is, transfer, computation, processing and control, and other kinds of processing for data. The control unit 407 executes a computer program stored in the storing unit 408 while using a part of the storing unit 408 as a working area. The computer program is a BIOS (Basic Input/Output System) or a UEFI (Unified Extensible Firmware Interface), an operating system program and a program for portable terminal control. The storing unit 408 stores the computer program to be executed by the control unit 407 and information necessary for the processing of the control unit 407. The storing unit 408 is a RAM (Random Access memory), a ROM (Read Only Memory), an SSD (Solid State Drive), a HDD (Hard Disc Drive) or a combination of these devices. The control to be executed by the control unit 407 is explained later.

Figure 3:
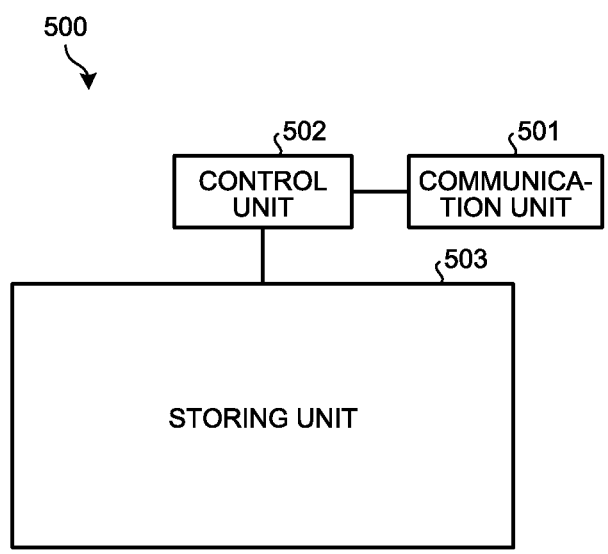
FIG. 3 is a block diagram showing the configuration of a server.

FIG. 3 is a block diagram showing the configuration of the server 500. The server 500 includes a communication unit 501, a control unit 502 and a storing unit 503.

The communication unit 501 communicates with the air conditioner system 200 and the portable terminal 400 via the Internet line 300. The communication unit 501 sends a received signal to the control unit 502, and transmits a signal outputted from the control unit 502 to the air conditioner system 200 or the portable terminal 400 that is a communication destination thereof.

The control unit 502 controls the operations of the communication unit 501 and the storing unit 503, causes the storing unit 503 to store information received from apparatuses/devices via the Internet line 300, and transmits the information stored in the storing unit 503 to the apparatuses/devices via the Internet line 300. The control unit 502 is a processor such as a CPU (Central Processing Unit) and is a device that executes commands described in a computer program, that is, transfer, computation, processing and control, and other kinds of processing for data. The control unit 502 executes a computer program stored in the storing unit 503 while using a part of the storing unit 503 as a working area. The computer program is a BIOS (Basic Input/Output System) or a UEFI (Unified Extensible Firmware Interface), an operating system program and a program for air conditioning processing.

The storing unit 503 stores various kinds of information on the air conditioners 250, 251 and 252 of the air conditioner system 200, acquired via the communication unit 501. The storing unit 503 is a RAM (Random Access memory), a ROM (Read Only Memory), an SSD (Solid State Drive), a HDD (Hard Disc Drive) or a combination of these devices, and is a device that stores the computer program to be executed by the control unit 502 and information necessary for the processing of the control unit 502.

Next, a processing operation of the support system 100 is explained. In the support system 100, the target air conditioners 250, 251 and 252 to be supported are registered in the server 500 by operation of the operator 600. The operator 600 performs the registration operation in the event of setting of the air conditioners 250, 251 and 252 or in the event of a support start with the support system 100. The operator 600 performs registration of the air conditioners using the portable terminal 400. Specifically, the operator 600 registers individual identification information and position information of the air conditioner to be registered in association with each other. The individual identification information is a unique code set for each of the air conditioners and is, for example, a manufacturing number. Alternatively, the portable terminal 400 may associate a model name and a manufacturing date of a product in addition to the individual identification number. The support system 100 causes the server 500 to store the individual identification number and the position information associated with each other.

The support system 100 can specify the position information of the air conditioner on the basis of the position information detected by the positioning unit 404 of the portable terminal 400. Specifically, the operator 600 disposes the portable terminal 400 near the air conditioner to be registered and inputs an operation indicating position information of the air conditioner to be registered. When detecting the operation, the portable terminal 400 detects information concerning the present position with the positioning unit 404, and transmits the detected information concerning the present position to the server 500 via the communication unit 406 as the position information of the air conditioner to be registered.

The support system 100 may specify the position information of the air conditioner on the basis of information inputted to the portable terminal 400 by the operator 600. Specifically, the support system 100 may set position information inputted to the input unit 403 by the operator 600 as the position information of the air conditioner. The operator 600 may input the position information of the air conditioner with a device other than the portable terminal 400. When detecting an input for the present position, the portable terminal 400 transmits information concerning the inputted present position to the server 500 via the communication unit 406 as the position information of the air conditioner to be registered.

In the support system 100, a positioning device that can measure position information may be connected to the air conditioner to be registered, to specify the position information of the air conditioner on the basis of the position information measured by the positioning device. The positioning device is a device that acquires information concerning the present position in various methods as with the positioning unit 404 and outputs information concerning the present position to apparatuses/devices connected to the positioning device. Specifically, the positioning device detects position information in a state in which the positioning device is connected to the air conditioner, and sends the detected position information to the connected air conditioner. The air conditioner sends the position information acquired from the positioning device to the server 500 as the position information of the air conditioner to be registered.

Then, in the support system 100, the air conditioner to be registered can set information stored in the air conditioner to be registered, as an individual identification information. Specifically, the support system 100 causes the air conditioner to store information concerning a manufacturing number or a model name registered in a time of shipment or in a time of manufacturing of the air conditioner. When an instruction to output the individual identification information is inputted from the remote controller or the portable terminal 400 or when detecting installation of the air conditioner in the room 8, the air conditioner transmits the stored individual identification information to the server 500.

The support system 100 may acquire the individual identification information of the air conditioner to be registered, using the portable terminal 400. Specifically, when an image associated with the individual identification information is pasted on the air conditioner to be registered, the image associated with the individual identification information is photographed by the image pickup unit 401 to acquire the individual identification information of the air conditioner to be registered. The portable terminal 400 transmits the acquired individual identification information to the server 500. The image associated with the individual identification information may be characters or numbers indicating the individual identification information or may be a code represented in a barcode or QR Code®.

Subsequently, the support system 100 also sets, as the individual identification information, controlled groups, refrigerant addresses and serial numbers of the air conditioners to be registered. The controlled group, the refrigerant address and the serial number of the air conditioner to be registered may be inputted in the input unit 403 by the operator 600, may be inputted from the remote controller at a time of installing the air conditioner, may be set by the air conditioner communicating with other apparatuses/devices, or may be allocated by the server 500. For example, in the first embodiment, the air conditioner 250 of the air conditioner group 200A is set to an air conditioner of the group A, a refrigerant address 0 and a serial number 1, the air conditioner 251 of the air conditioner group 200A is set to an air conditioner of the group A, a refrigerant address 1 and a serial number 2, and the air conditioner 252 of the air conditioner group 200B is set to an air conditioner of the group B, the refrigerant address 0 and a serial number 1. The support system 100 allocates different-refrigerant addresses to the air conditioners in the same controlled group.

The server 500 stores the individual identification information and the position information acquired as explained above in association with each other. The support system 100 also transmits operation information and information concerning an abnormality history from the air conditioners 250, 251 and 252 to the server 500. The server 500 stores the operation information and the information concerning the abnormality history in association with the individual identification information and the position information. The position information includes, for example, information concerning the latitude and longitude and information concerning a building name, a floor number, a room ID and a coordinate in a room. The abnormality history includes days when abnormalities occur and contents of abnormalities (abnormality codes). Information concerning likelihood of an abnormality and limitation of operation may be included in the abnormality history.

As operation information of the air conditioners, at least one of pieces of information concerning a preset temperature of the air conditioner, an indoor temperature (room temperature) of a place where the indoor unit is installed, a piping temperature of the air conditioner, and an output/input state of the air conditioner is exemplified. The information concerning the output/input state includes information concerning fan speed of the air conditioner. The abnormality history of each air conditioner is, for example, information concerning date and times when an abnormality has been caused in the air conditioner and a type of the caused abnormality, and includes information obtained when an abnormality currently occurs.

Figure 4:
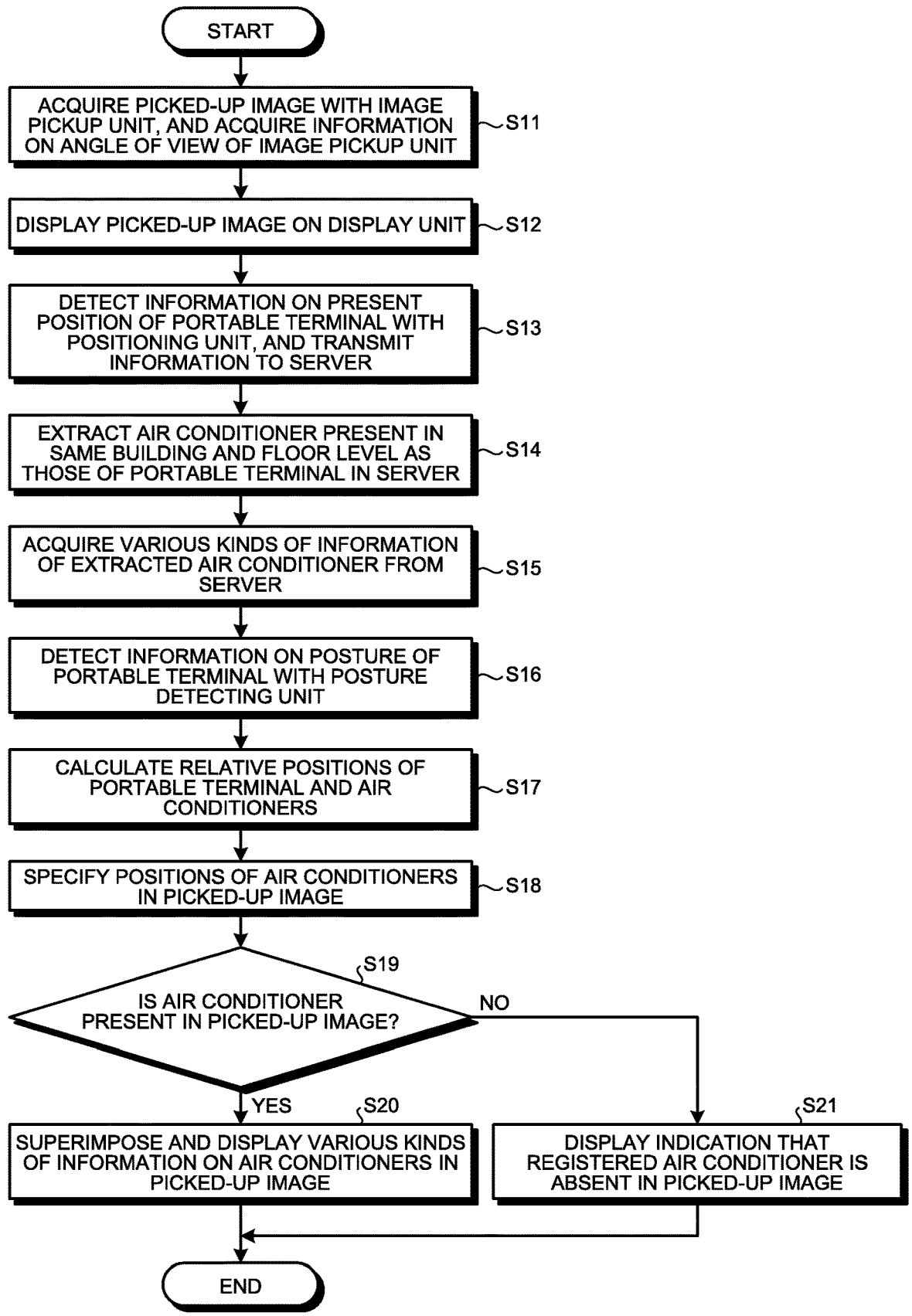
FIG. 4 is a flowchart showing an example of processing in the maintenance support system.

Now an operation in the event of maintenance of the support system 100 is explained. FIG. 4 is a flowchart showing an example of processing in the maintenance support system 100. The processing shown in FIG. 4 can be realized by the portable terminal 400 and the server 500 detecting an operation inputted by the operator 600 and executing various kinds of processing.

When detecting processing for starting an application for maintenance or a photographing command inputted to the input unit 403, the control unit 407 of the portable terminal 400 acquires a picked-up image by the image pickup unit 401 and acquires information concerning an angle of view of the image pickup unit 401 (step S11). That is, when detecting an operation, the portable terminal 400 starts photographing and further acquires the information concerning the angle of view of the image pickup unit 401.

When a picked-up image is acquired by the image pickup unit 401, the control unit 407 causes the display unit 402 to display the acquired picked-up image (step S12). Subsequently, the control unit 407 detects, with the positioning unit 404, information concerning the present position of the portable terminal 400, and transmits the detected information concerning the present position of the portable terminal 400 to the server 500 via the communication unit 406 (step S13).

When acquiring the information concerning the present position of the portable terminal 400, the server 500 extracts, with the control unit 502, the air conditioner present in a building in a position same as the present position of the portable terminal 400 and present in a floor number same as a floor number of the portable terminal 400 on the basis of the information concerning the present position and the information stored in the storing unit 503 (step S14). The control unit 502 transmits position information, individual identification information, operation information and an abnormality history of the extracted air conditioner to the portable terminal 400 via the communication unit 501. The control unit 407 receives and acquires the position information, the individual identification information, the operation information and the abnormality information (in FIG. 4, abbreviated as various kinds of information) of the air conditioner received from the server 500 via the communication unit 406 (step S15).

Subsequently, the control unit 407 detects, with the posture detecting unit 405, information concerning the posture of the portable terminal 400 (step S16). The control unit 407 calculates a positions of the air conditioner with respect to the portable terminal 400 on the basis of the information concerning the present position of the portable terminal 400 detected by the positioning unit 404 and the position information of the air conditioners received from the server 500 (step S17). The control unit 407 specifies a position of each air conditioner in the picked-up image on the basis of the information concerning the angle of view of the image pickup unit 401, the information concerning the posture of the portable terminal 400 detected by the posture detecting unit 405, and information concerning relative positions of the air conditioners with respect to the portable terminal 400 (step S18).

The control unit 407 determines whether the air conditioner is present in the picked-up image (step S19) on the basis of a specifying result of the positions of the air conditioners in the picked-up image. If determining that at least one of the air conditioners registered in the support system 100 is present in the picked-up image (Yes at step S19), the control unit 407 causes, concerning the air conditioners determined as being present in the picked-up image, the display unit 402 to display the air conditioners included in the picked-up image and at least one of the various kinds of information of the air conditioners received from the server 500, specifically, the individual identification information, the operation information and the abnormality histories in association with each other and with superimposing one on another (step S20). If determining that the air conditioner registered in the support system 100 is absent in the picked-up image (No at step S19), then the control unit 407 causes the display unit 402 to display a presentation to the effect that the air conditioner registered in the support system 100 is absent in the picked-up image (step S21).

An example of a display screen of the display unit 402 on which the image is displayed at step S20 is explained with reference to FIGS. 5 to 8. In FIGS. 5 to 8, description is given for the air conditioners 250, 251 and 252 are included in a picked-up image to be photographed, and an abnormality occurs in the air conditioner 250 but no abnormality occurs in the air conditioners 251 and 252. In addition, although the air conditioners displayed in FIGS. 5 to 8 are photographed images, description is made with the same reference numerals being added to the images for convenience of the description.

Figure 5:
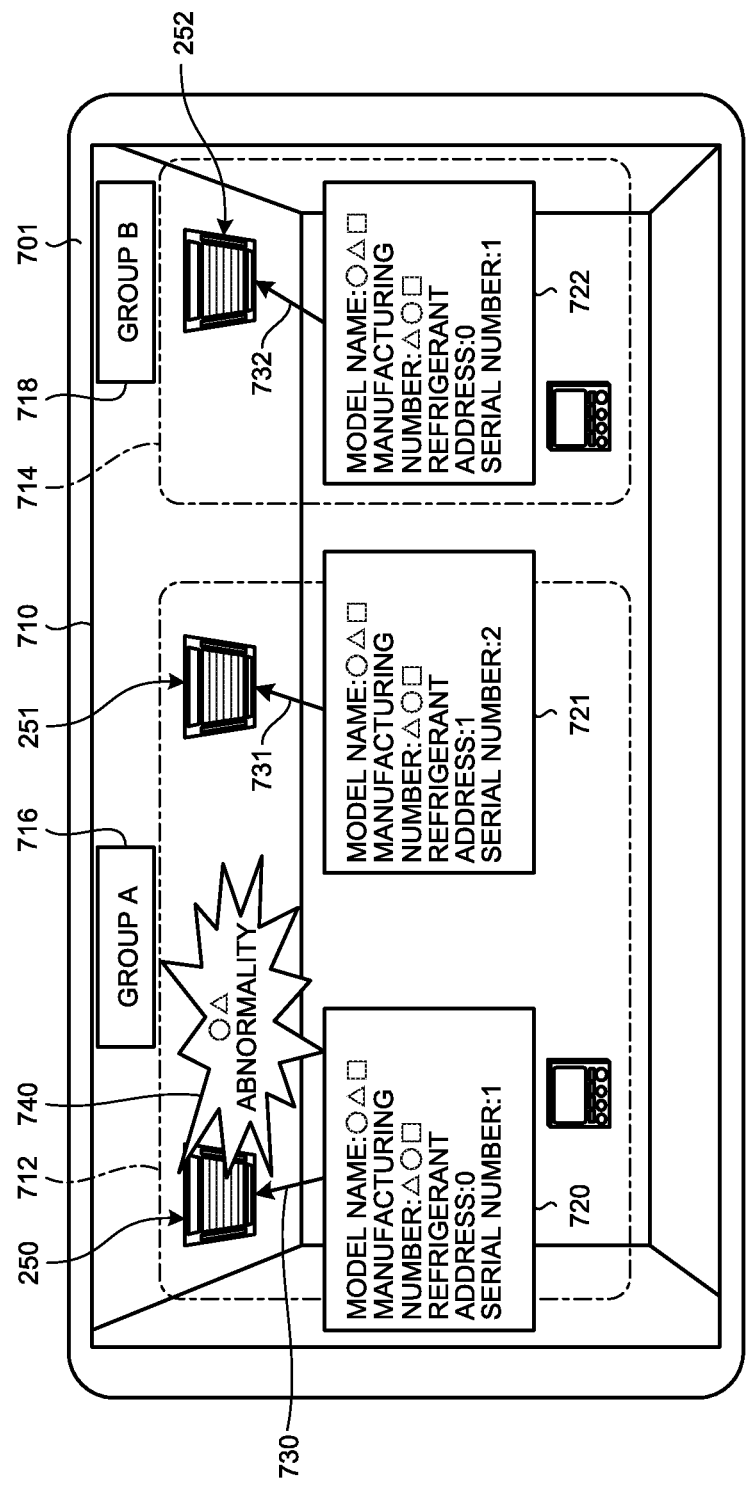
FIG. 5 is an illustration showing an example of a display screen displayed on a display unit of the portable terminal.

FIG. 5 is an illustration showing an example of a display screen displayed on the display unit 402 of the portable terminal 400. A display screen 701 is an image displayed on the display unit 402. On the display screen 701, there is displayed an image obtained by superimposing frames 712 and 714, items 716 and 718, individual identification information columns 720, 721 and 722, arrows 730, 731 and 732, and an abnormality information displaying column 740 on a picked-up image 710 including indoor units of the air conditioners 250, 251 and 252.

The frame 712 is an image indicating a range including the air conditioners 250 and 251 of the group A and surrounds the indoor units of the air conditioners 250 and 251. The frame 714 is an image indicating a range including the air conditioner 252 of the group B and surrounds the indoor unit of the air conditioner 252. The item 716 is put in around the frame 712. The item 716 includes characters of "group A" and indicates that the air conditioners in a region surrounded by the frame 712 belong to the group A. The item 718 is put in around the frame 714. The item 718 includes characters of "group B" and indicates that the air conditioner in a region surrounded by the frame 714 belongs to the group B.

In the individual identification information column 720, individual identification information of the air conditioner 250 is described. In the individual identification information column 721, individual identification information of the air conditioner 251 is described. In the individual identification information column 722, individual identification information of the air conditioner 252 is described. As the individual identification information, information concerning model names, manufacturing numbers, control groups, refrigerant addresses and serial numbers of the air conditioners 250, 251 and 252 is displayed. The arrow 730 connects the individual identification information column 720 and the air conditioner 250. The arrow 731 connects the individual identification information column 721 and the air conditioner 251. The arrow 732 connects the individual identification information column 722 and the air conditioner 252. The abnormality information displaying column 740 is put in near the air conditioner 250. The abnormality information displaying column 740 includes a message indicating that an abnormality occurs in the air conditioner 250.

Figure 6:
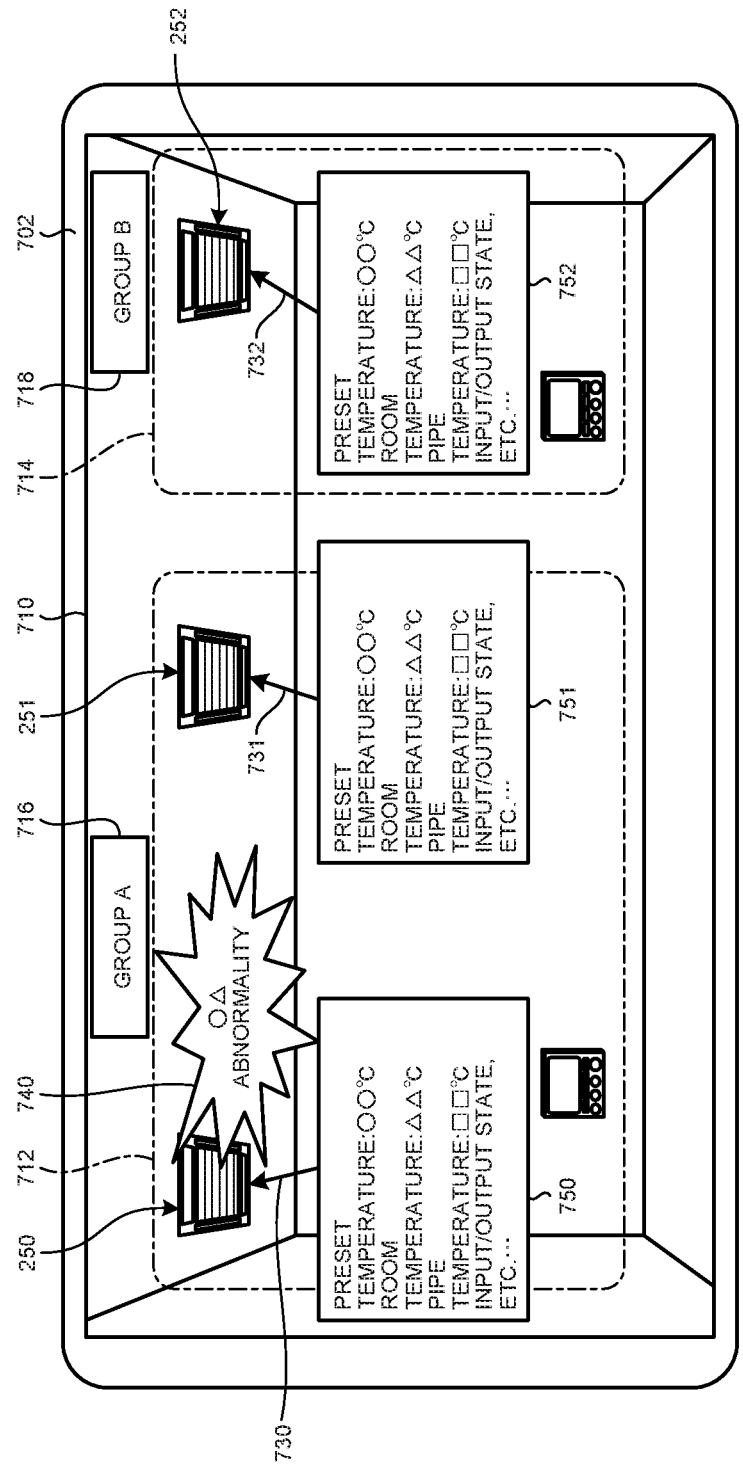
FIG. 6 is an illustration showing another example of the display screen displayed on the display unit of the portable terminal.

FIG. 6 is an illustration showing another example of the display screen displayed on the display unit 402 of the portable terminal 400. A display screen 702 is an image displayed on the display unit 402. The display screen 702 displays an operation information column instead of the individual identification information column. On the display screen 702, there is displayed an image obtained by superimposing the frames 712 and 714, the items 716 and 718, operation information columns 750, 751 and 752, the arrows 730, 731 and 732, and the abnormality information displaying column 740 on the picked-up image 710 including the indoor units of the air conditioners 250, 251 and 252.

In the operation information column 750, operation information of the air conditioner 250 is described. In the operation information column 751, operation information of the air conditioner 251 is described. In the operation information column 752, operation information of the air conditioner 252 is described. As the operation information, preset temperatures, room temperatures, piping temperature and output/input states of the air conditioners 250, 251 and 252 are displayed. The arrow 730 connects the operation information column 750 and the air conditioner 250. The arrow 731 connects the operation information column 751 and the air conditioner 251. The arrow 732 connects the operation information column 752 and the air conditioner 252.

Figure 7:
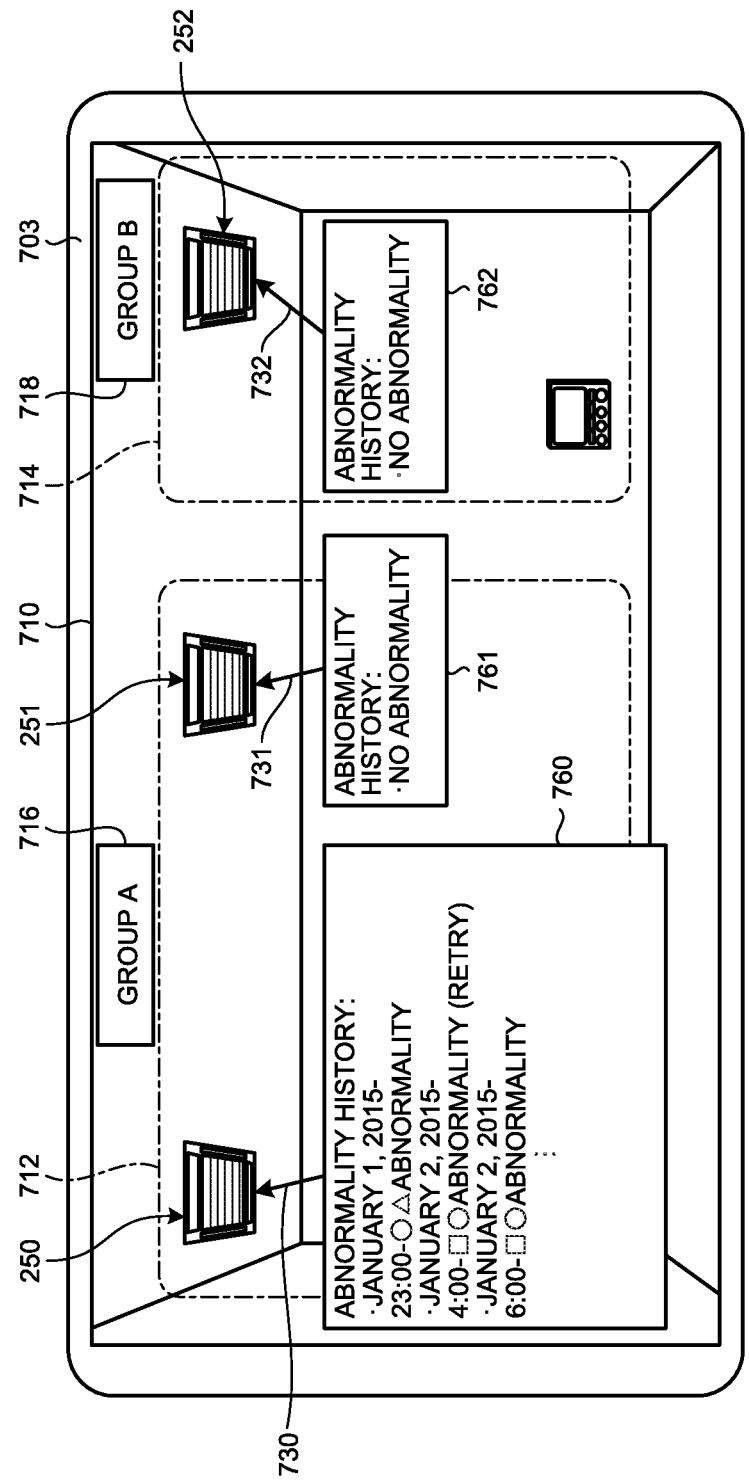
FIG. 7 is an illustration showing the other example of the display screen displayed on the display unit of the portable terminal.

FIG. 7 is an illustration showing yet another example of the display screen displayed on the display unit 402 of the portable terminal 400. A display screen 703 is an image displayed on the display unit 402. The display screen 703 displays an abnormality history column instead of the individual identification information column. On the display screen 703, there is displayed an image obtained by superimposing the frames 712 and 714, the items 716 and 718, abnormality history columns 760, 761 and 762, and the arrows 730, 731 and 732 on the picked-up image 710 including the indoor units of the air conditioners 250, 251 and 252.

In the abnormality history column 760, an abnormality history of the air conditioner 250 is described. In the abnormality history column 761, an abnormality history of the air conditioner 251 is described. In the abnormality history column 762, an abnormality history of the air conditioner 252 is described. As the abnormality histories, information concerning dates and times of occurrence of abnormalities and types of the abnormalities of the air conditioners 250, 251 and 252 is displayed. When an abnormality does not occur, "no abnormality" is displayed. The arrow 730 connects the abnormality history column 760 and the air conditioner 250. The arrow 731 connects the abnormality history column 761 and the air conditioner 251. The arrow 732 connects the abnormality history column 762 and the air conditioner 252.

Figure 8:
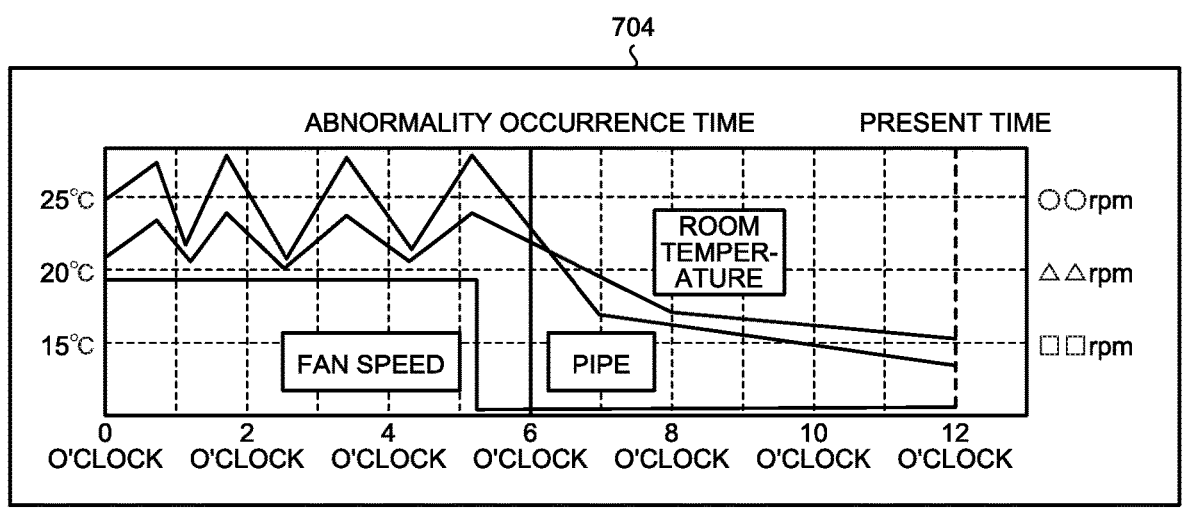
FIG. 8 is an illustration showing a further example of the display screen displayed on the display unit of the portable terminal.

FIG. 8 is an illustration showing a further example of the display screen displayed on the display unit 402 of the portable terminal 400. A display screen 704 displays operation information before and after occurrence of an abnormality concerning the air conditioner 250 in graph form. The display screen 704 preferably displays association with the air conditioner 250 using the arrow 730 as with the abnormality history column 760. The graph shown in FIG. 8 displays information concerning a room temperature, a piping temperature and a fan speed of the air conditioner 250 in six hours before and after occurrence of an abnormality. Note that the display screen 704 may be displayed at an initial event similarly to the display screens 701, 702 and 703, or may be displayed when an operation for requesting display of more detailed information of an abnormality is inputted in a state in which the display screens 701, 702 or 703 is displayed.

The support system 100 can make it easy to recognize states of the air conditioners by performing the processing shown in FIG. 4 and causing the display unit of the portable terminal 400 to display the screens shown in FIGS. 5 to 8, that is, by superimposing and displaying the information indicating the states of the air conditioners on the picked-up image of the air conditioners as explained above. When an abnormality occurs, the support system 100 displays the abnormality information displaying column indicating that occurrence. Consequently, the operator can easily grasp in which air conditioner the abnormality occurs. By specifying the positions of the air conditioners on the image on the basis of the position information and the posture information and indicating a correspondence relation between the various kinds of information and the air conditioners diagrammatically (in this example, the arrows) as in the embodiment, it is possible to clarify the correspondence relation. Consequently, the correspondence relation is made clearer than when the correspondence relation is displayed only with character information and displayed in a list form.

As explained above, the support system 100 photographs a picked-up image with the portable terminal 400, and displays the air conditioner included in the picked-up image and at least one of the individual identification information, the operation information and the abnormality history of the air conditioner in association with each other with one being superimposed on other. Therefore, the support system 100 can enable the operator 600 to easily and quickly discriminate the air conditioner in which abnormality occurs and a type of the abnormality having occurred. The support system 100 does not stop/halt an operation of the normal air conditioners. Therefore, it is possible to achieve improvement of serviceability without spoiling comfort.

The support system 100 causes the server 500 to store the operation information and the history information and, as shown in FIGS. 7 and 8, retrospectively displays the past operation information and abnormality history having been obtained when an abnormality occurred. Consequently, it is easy to specify a cause of the occurrence of the abnormality. Therefore, because a maintenance operation for the air conditioners can be carried out with a possible failure being predicted, it is possible to reduce wastes of the maintenance operation for the air conditioners.

Even in the case of different controlled groups, the support system 100 covers all the air conditioners that are registered in the support system 100 beforehand and included in the air conditioner system 200, and acquires, at a time, information concerning the air conditioner in which an abnormality currently occurs. Therefore, labor of the operator 600 in checking whether abnormalities occur in the air conditioners is reduced. The support system 100 can additionally register an air conditioner. Therefore, the support system 100 provides convenience not affected by installation and discarding of an air conditioner.

The configuration explained in the embodiment above shows an example of the contents of the present invention and can be combined with other publicly-known technologies. A part of the configuration can be omitted or changed within a scope without departing from the spirit of the present invention.

The invention claimed is:

1. A maintenance support system that supports maintenance of an air conditioner system for a plurality of air conditioner groups including a plurality of air conditioners disposed in one room and connected to a communication line, the maintenance support system comprising:
- a server connected to the air conditioner system via the communication line, the server storing position information, and at least one of individual identification information, operation information and abnormality history for each air conditioner of the plurality of air conditioners; and
- a portable terminal connected to the server via the communication line, the portable terminal receiving at least one of the individual identification information, the operation information and the abnormality history of each of the air conditioners from the server, wherein the portable terminal includes:
- an image pickup unit that acquires a picked-up image of air conditioners;
- a positioning unit that detects information concerning a present position of the portable terminal;
- a posture detecting unit that acquires information concerning a posture of the portable terminal; and
- a control unit that:
  - transmits the information concerning the present position of the portable terminal to the server and specifies, on the basis of a response from the server including the position information of the plurality of air conditioners that are present in a building and a floor in which the portable terminal is present, the air conditioners included in the picked-up image,
  - calculates relative positions of the air conditioners included in the picked-up image with respect to the portable terminal on the basis of the information concerning the present position of the portable terminal and the position information of the air conditioners included in the picked-up image,
  - specifies a position of each air conditioner on the picked-up image included in the picked-up image on the basis of an angle of view of the picked-up image, the information concerning the posture of the portable terminal and the relative positions of the air conditioners, and
  - determines whether an air conditioner of the plurality of air conditioners is included in the picked-up image, and when at least one air conditioner of the plurality of air conditioners is present in the picked-up image, creates an image obtained by superimposing, on the air conditioner included in the picked-up image, at least one of the corresponding individual identification information, operation information and abnormality history of the air conditioner; and
- a display unit that displays the image created by the control unit.

2. The maintenance support system for air conditioners according to claim 1, wherein
the portable terminal detects the information concerning the present position with the positioning unit, and transmits the detected present position information to the server as position information of the air conditioner to be registered, and
the server stores the position information of the air conditioner to be registered, which is received from the portable terminal.

3. The maintenance support system for air conditioners according to claim 1, wherein
the portable terminal receives an input of position information, and transmits the received position information to the server as position information of the air conditioner to be registered, and
the server stores the position information of the air conditioner to be registered, which is received from the portable terminal.

4. The maintenance support system for air conditioners according to claim 1, wherein
the air conditioner acquires position information from a positioning device connected to the air conditioner, and transmits the acquired position information to the server as position information of the air conditioner, and
the server stores the position information of the air conditioner to be registered, which is received from the air conditioner.

5. The maintenance support system for air conditioners according to claim 1, wherein
the portable terminal transmits the individual identification information of the air conditioner to be registered to the server, and
the server stores the individual identification information of the air conditioner to be registered, which is received from the portable terminal.

6. The maintenance support system for air conditioners according to claim 5, wherein
the air conditioner has a code associated with at least a part of the individual identification information, and
the portable terminal acquires an image of the code with the image pickup unit, acquires the individual identification information of the air conditioner to be registered from the acquired code, and transmits at least a part of the acquired individual identification information to the server.

7. The maintenance support system for air conditioners according to claim 5, wherein the portable terminal receives an input of the individual identification information of the air conditioner to be registered, and transmits the received individual identification information of the air conditioner to be registered to the server.

8. The maintenance support system for air conditioners according to claim 1, wherein
the air conditioner transmits at least a part of the individual identification information of the air conditioner to the server, and
the server stores the individual identification information received from the air conditioner as the individual identification information of the air conditioner.

9. The maintenance support system for air conditioners according to claim 1, wherein, when the air conditioner in which an abnormality occurs is included in the picked-up image, the control unit creates an image in which information concerning the abnormality is associated with the air conditioner in which the abnormality occurs.

10. The maintenance support system for air conditioners according to claim 9, wherein the control unit creates an image in which the operation information including the operation information before and after the occurrence of the abnormality is associated with the air conditioner in which the abnormality occurs.

* * * * *